(12) United States Patent
Chennaz

(10) Patent No.: US 9,332,743 B2
(45) Date of Patent: May 10, 2016

(54) FISHING LURE

(71) Applicant: Dominique Chennaz, Geneva (CH)

(72) Inventor: Dominique Chennaz, Geneva (CH)

( * ) Notice: Subject to any disclaimer, the term of this patent is extended or adjusted under 35 U.S.C. 154(b) by 84 days.

(21) Appl. No.: 14/266,007

(22) Filed: Apr. 30, 2014

(65) Prior Publication Data

US 2014/0325890 A1 Nov. 6, 2014

(30) Foreign Application Priority Data

May 2, 2013 (FR) ...................... 13 01022

(51) Int. Cl.
*A01K 85/00* (2006.01)
*A01K 85/01* (2006.01)
*A01K 85/16* (2006.01)

(52) U.S. Cl.
CPC ................ *A01K 85/01* (2013.01); *A01K 85/16* (2013.01)

(58) Field of Classification Search
USPC .................................. 43/42.06, 42.12, 42.36
See application file for complete search history.

(56) References Cited

U.S. PATENT DOCUMENTS

| | | | | |
|---|---|---|---|---|
| 2,526,077 A * | 10/1950 | Jurczak | ............ | A01K 85/16 43/42.12 |
| 2,560,733 A * | 7/1951 | Morris | ............ | A01K 85/16 43/42.06 |
| 2,565,205 A * | 8/1951 | Culver | ............ | A01K 85/16 43/42.06 |
| 2,574,702 A * | 11/1951 | Moulton | ............ | A01K 85/16 43/42.12 |
| 2,577,402 A * | 12/1951 | Carnes | ............ | A01K 85/16 43/42.08 |
| 2,593,199 A * | 4/1952 | Salg | ............ | A01K 85/16 43/42.06 |
| 2,653,408 A * | 9/1953 | Bradley | ............ | A01K 85/12 43/42.12 |
| 2,788,603 A | 4/1957 | Lindemann | | |
| 2,797,518 A * | 7/1957 | Anderson | ............ | A01K 85/16 43/42.06 |
| 3,344,548 A | 10/1967 | Kurlovich | | |
| 3,507,070 A * | 4/1970 | Rossello | ............ | A01K 85/16 43/42.06 |
| 3,648,397 A * | 3/1972 | Du Bois | ............ | A01K 85/16 43/42.12 |
| 3,650,062 A * | 3/1972 | Troyer | ............ | A01K 85/16 43/42.06 |
| 3,680,247 A * | 8/1972 | McKenzie | ............ | A01K 85/16 43/42.17 |
| 3,947,989 A * | 4/1976 | Bart | ............ | A01K 91/06 43/42.09 |
| 5,224,285 A * | 7/1993 | Kamin | ............ | A01K 85/01 43/17.6 |

(Continued)

FOREIGN PATENT DOCUMENTS

FR 2 477 374 9/1981

OTHER PUBLICATIONS

Search Report dated Jan. 10, 2014 in corresponding French priority application 13/01022 (2 pages including English translation).

*Primary Examiner* — Christopher P Ellis

(74) *Attorney, Agent, or Firm* — Brinks Gilson & Lione; G. Peter Nichols

(57) ABSTRACT

A fishing lure includes a body in non-metallic material having a front end and a rear end; a first attaching means or loop arranged at the front end; a second attaching means or loop arranged at the rear end; a longitudinal connecting rod passing through the body and connecting the first attaching means with the second attaching means; wherein the lure comprises at least one hole arranged in the body between the front end and the rear end, and wherein the connecting rod passes through the hole.

16 Claims, 1 Drawing Sheet

(56) References Cited

U.S. PATENT DOCUMENTS

| | | | | |
|---|---|---|---|---|
| 5,233,785 | A * | 8/1993 | Ching | A01K 85/16 43/42.05 |
| 5,787,633 | A * | 8/1998 | Taylor | A01K 85/16 43/42.02 |
| 6,354,037 | B2 * | 3/2002 | Coppola, Jr. | A01K 85/01 43/42.06 |
| 6,523,297 | B1 | 2/2003 | Hair, III et al. | |
| 7,757,425 | B2 * | 7/2010 | Herasymchuk | A01K 85/01 43/42.23 |
| 8,915,012 | B2 * | 12/2014 | Burdick | A01K 85/18 43/42.09 |
| 2006/0042147 | A1 * | 3/2006 | Jenkins | A01K 91/04 43/42.09 |
| 2007/0101635 | A1 * | 5/2007 | Rike | A01K 85/01 43/42.06 |
| 2007/0240359 | A1 * | 10/2007 | Jalbert | A01K 85/16 43/42.22 |
| 2009/0282726 | A1 | 11/2009 | Herasymchuk | |
| 2013/0199080 | A1 * | 8/2013 | Woosley | A01K 85/00 43/42.36 |

\* cited by examiner

FISHING LURE

BACKGROUND

This application claims priority to French patent application No. 13/01022 filed May 2, 2013, the entire contents of which are incorporated herein by reference.

The present invention generally concerns a fishing lure.

Some fishing lures designed to swim on the water surface when reeled in after casting have a concave head arranged to create stimuli such as sounds, vibrations, water droplets which may attract the attention of fish and prompt attacking of the lure. However such lures called "poppers" only create stimuli at their front surface.

Other diving lures designed to swim under the water surface when retrieved after casting may be equipped with propellers upstream and downstream of the body of the lure to create stimuli such as buzzing, eddies, pressure waves, air bubbles also to attract the attention of fish and provoke a strike. On the other hand this mechanism has the drawback in particular of being cumbersome since the propellers lie in front of and behind the body of the lure, which may cause entangling with the line attaching the lure to the fishing rod. In addition these propellers may get caught up with vegetation or other objects in the water which can damage the propellers, twisting them or even causing loss of the lure. Finally, the attaching of hooks to the lure is more complicated since any snagging between the hooks and propellers must be avoided.

SUMMARY

It is one objective of the present invention to overcome the aforementioned disadvantages of the prior art and in particular first to propose a fishing lure capable of creating numerous stimuli to attract the attention of fish without being complicated to manufacture and secondly not having an increased risk of becoming entangled with the fishing line attaching the lure to the fishing rod.

For this purpose, according to a first aspect, the invention concerns a fishing lure comprising: a body with at least one part in non-metallic material having a front end and a rear end; first attaching means (loop) arranged at the front end; second attaching means (loop) arranged at the rear end; a longitudinal connecting rod passing through the body and linking the first attaching means with the second attaching means; characterized in that the lure comprises at least one hole arranged in the body between the front end and the rear end, and in that the connecting rod passes through the hole. In one embodiment, the hole passes through the body of the lure, and in one embodiment the hole is a through-hole in a transverse direction of the body of the lure.

The lure of the present invention, by means of the hole arranged in the body, generates more stimuli since when the fishing lure is swimming the hole perturbs the flow of water around the lure so that stimuli are created in the form of pressure waves, noises, water droplets, air bubbles or cavitation. The hole can be arranged in a transverse direction of the body to increase the flow perturbing effect. The fishing lure therefore has better attraction. However, by definition, a hole does not form an obstacle projecting from the body of the fishing lure, which means that there cannot be any interaction with the fishing line attaching the lure to the fishing rod or any snagging on vegetation suspended in the water which is being fished. In other words, the lure according to this embodiment generates stimuli along the length of its body without increasing risks of entanglement or snagging. Finally the robustness of the fishing lure is not affected since the connecting rod passes through the hole which largely offsets the weakness created by perforating the hole.

Advantageously, the said at least one hole is a through-hole and is transverse in relation to the longitudinal direction of the body. According to this embodiment, the body does not comprise any assembly or added part, and the hole is pierced directly in the body crossing the lure from one side to the other. Water is able to flow into the hole and pass from one side to the other, which increases turbulence and cavitation, to produce more attracting stimuli. Therefore the lure according to this embodiment is very simple to manufacture (since there is no added or mobile part) but nevertheless produces stimuli through the presence of the hole which disturbs the flow of water around the body.

Advantageously, the body of the lure is monolithic. The body of the lure according to this embodiment has no articulated part, but with the hole, it still can produce stimuli to attract the attention of fish.

According to one embodiment, the body of the lure is arranged so that the lure has a density of less than 2 $g/cm^3$. According to this embodiment, lures with a density of less than 2 $g/cm^3$, even if they have a body with a metallic part, require a connecting rod passing through the hole in the body to guarantee good strength. The body of the lure, to reach this density is mostly made of non-metallic and/or fragile materials and/or comprises hollows or air reserves which reduce density but also the resistance of the body. Ideally the lures have a density of between 0.5 $g/cm^3$ and 1.5 $g/cm^3$.

According to one embodiment, the body of the fishing lure is entirely non-metallic. For floating or neutral buoyancy lures, light materials must be used which excludes metallic materials and the cross-through connecting rod provides the lure with necessary solidity despite the presence of one or more holes in the body of the lure.

According to one embodiment, the fishing lure comprises at least one mobile body arranged in the hole and attached onto the connecting rod. The connecting rod is used to act as anchor point in addition to its contribution towards the strength of the lure. Also, the mobile body arranged in the hole will increase the generation of stimuli, but will not be a source of entanglement or snagging since it does not project beyond the hole and does not form a projection from the body of the fishing lure. Finally, the hole perturbs the flow of water and hence eddying is created which will further agitate the mobile body to generate even further stimuli when the fishing lure is swimming.

According to one embodiment, the hole has a circular cross-section. The hole is thus easier to form.

According to one embodiment, the hole has a cross-section having at least one dimension equal to or greater than ten millimeters.

According to one embodiment, the length of the fishing lure is equal to or greater than fifty millimeters.

According to one embodiment, the mobile body comprises a propeller spinning on the connecting rod. The connecting rod provides an ideal axis of rotation for a propeller and mounting is simplified. In addition, the propeller in the hole is located in a perturbed or even accelerated flow region which increases the efficacy thereof.

According to one embodiment the mobile body comprises at least one bead threaded on the connecting rod.

According to one embodiment the mobile body comprises at least one quick attachment mechanism attached to the connecting rod. The connecting rod, which therefore has an accessible portion inside the hole, is given further use to attach any kind of accessory. It can be envisaged to attach an olfactory accessory for example to add another category of stimuli.

According to one embodiment the mobile body comprises a swivel to attach an elongate body.

According to one embodiment the hole is arranged in a rear half of the body.

According to one embodiment the fishing lure forms a casting lure. This type of lure moving in the water at great speed is well adapted to create stimuli inside the hole.

According to one embodiment the fishing lure forms a surface lure arranged to float on the water. For a lure with a concave head which already creates stimuli, the hole allows the generation of stimuli on the remainder of the body to increase the attracting power of the fishing lure.

According to one embodiment, the hole has an intersecting edge with the body of the lure and this edge is at least partly beveled. With the bevel, the flow of water can be modulated or oriented in relation to desired effects.

According to one embodiment, the edge is beveled over at least one part upstream of the hole. The water will therefore be guided towards the hole and accelerated therein. In combination with the embodiment in which the mobile body is a propeller, its spinning effect will be improved.

According to one embodiment, the edge is beveled or chamfered over at least one part downstream of the hole.

According to this embodiment, the edge is sharp over a part lying upstream of the hole. This will cause a distinct break in flow to promote the onset of cavitation or air bubbles in the hole.

According to one embodiment, the edge is sharp over a part lying downstream of the hole.

BRIEF DESCRIPTION OF THE DRAWINGS

Other characteristics and advantages of the present invention will become better apparent on reading the following detailed description of one embodiment of the invention given as an example that is in no way limiting and illustrated by the appended drawings in which.

DETAILED DESCRIPTION

A distinction is to be made between freshwater and saltwater. In relation to final use, whether in freshwater or saltwater, the density of the lure may differ while having the same behaviour (floating, sinking or neutrally buoyant). In the latter case, a lure is said to be neutrally buoyant when its density is equal to the density of the water: it remains at a stationary depth in the water. One of the problems with lures whose density is close to that of the water is their robustness since the materials used to manufacture their body must be lightweight or else they must have inner air volumes to ensure floatability reserves, which may affect the general solidity of the lure.

Figure 1:
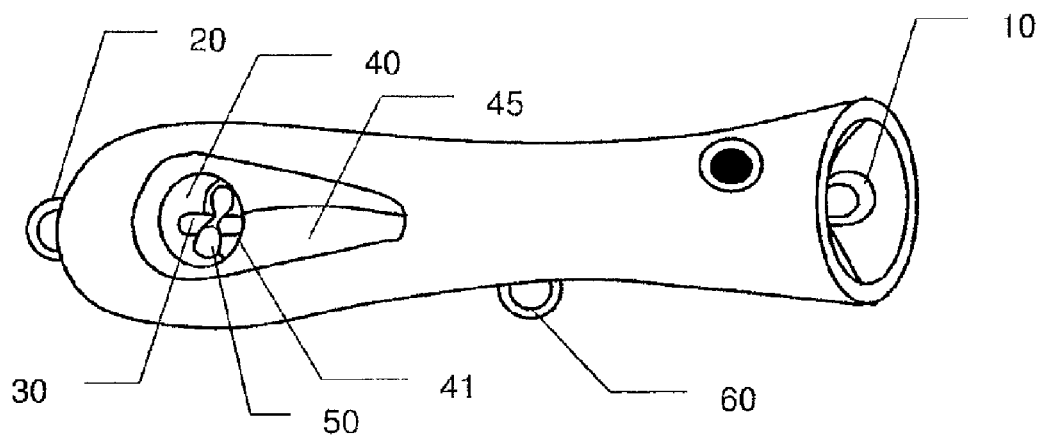
FIG. 1 is a perspective view of a first variant of the lure according to the invention.

FIG. 1 illustrates a surface lure according to the invention. The lure in FIG. 1 is designed to float on the surface of the water. The body of the lure has a front part with first attaching means 10 and a rear part with second attaching means 20. The body of the lure can be made in different non-metallic materials so that its density is lower than the density of the water and it can float. It can be envisaged to form the body of the lure in resin or plastic for example.

The first attaching means 10 are designed to be attached to a fishing line connecting the lure to a fishing rod. A third attaching means (loop) 60 is arranged underneath the lure, and hooks (not illustrated) to capture fish are hooked onto the second attaching means 20 and onto the third attaching means 60. To provide good mechanical strength a connecting rod 30 crosses the lure from front to rear to connect the first attaching means 10 with the second attaching means 20.

The illustrated lure is designed to be cast then brought to the surface of the water by the person fishing, while creating stimuli to attract and provoke a strike by fish and the capture thereof. For this purpose, the front part of the lure is a concave surface which churns up water droplets when the lure is drawn by a fishing line attached to the first attaching means 10. These eddies and water droplets created by the front surface cause noises and pressure waves which propagate in the water and attract the attention of surrounding fish.

To increase the chances of attracting a fish, the lure of the present invention is designed additionally to create stimuli at the rear part. For this purpose, a hole 40 passes through the body of the lure close to the rear part in the latter third of the body of the fishing lure. The hole 40 is a through-hole and oriented in a transverse direction relative to the body of the lure; therefore when the lure is caused to swim by the person retrieving the lure, the flow of water around the rear part of the lure is perturbed by the hole 40. The presence of the hole 40 will cause eddies, water droplets can be sprayed around the lure, air bubbles may also be created in the hydraulic current around the lure, this resulting in sounds, pressure waves, light flashes propagated in the water in the vicinity of the lure.

The hole 40 has an edge 41 at its intersection with the body of the lure, and this edge 41 is beveled on its circumference to cause a particular flow of water inside the hole 40. The bevel of the edge 41 upstream of the hole 40 forms an elongate cut-out 45 which forms a progressive reduction in the cross-section of the body of the lure, to increase the speed of the water as it approaches the hole 40.

So as not to jeopardize the solidity of the lure, the connecting rod 30 connects the first attaching means 10 to the second attaching means 20, and the invention provides for the passing of the connecting rod 30 through the hole 40, to make use thereof as additional attaching means. The illustrated lure comprises a propeller 50 mounted on the connecting rod 30, inside the hole 40. When the lure is swimming the propeller 50 spins around the connecting rod 30, which causes even further stimuli and its positioning inside the hole 40 which undergoes commotion means that the propeller will spin irregularly and the noises and buzzing associated therewith will be random and have better attraction.

Figure 2:
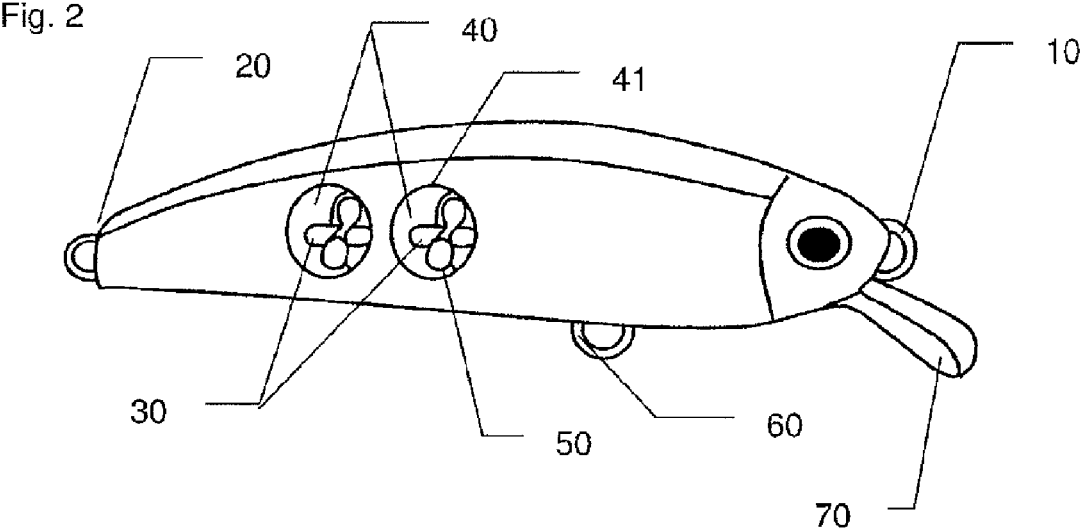
FIG. 2 is a perspective view of a second variant of a lure according to the invention.

FIG. 2 illustrates a second variant of a lure according to the invention. The illustrated lure is a diving lure since it has a lip 70 on the front surface. When swimming at the time of retrieval this lip 70 will cause the lure to dive below the surface. The density of the lure may the lower than, equal to or greater than the density of the water to create a plurality of swimming movements (floating, stationary or sinking respectively).

The lure also comprises first attaching means 10 at the front part and second attaching means 20 at the rear part, connected together by a connecting rod 30. The first attaching means 10 are arranged to be attached to a fishing line and the lure comprises third attaching means 60 which are arranged to receive a hook, in the same manner as the second attaching means 20.

To create sound and pressure stimuli, two through holes 40 are arranged in the rear part, the connecting rod 30 passing through each one. It is to be noted that the solidity of the lure is not affected by the presence of several holes 40 since the connecting rod 30 passes through them and directly transmits to the first attaching means 10 the forces that are applied to the second attaching means 20.

On this lure, the edges 41 of each hole 40 with the body of the lure are projecting edges to create a sudden change in water flow conditions around the body of the lure. This sudden change in geometry allows the forming of eddies, turbulence, possibly cavitation, and air bubbles can be trapped or formed inside the hole 40 so that numerous sound or pressure stimuli will propagate in the water in the vicinity of the lure.

Propellers 50 are mounted on the connecting rod 30, and their spinning will cause additional stimuli. However, it can be envisaged to install beads (whether or not metallic) on the connecting rod 30 which can slide along that part of the connecting rod 30 which passes through the holes 40, these beads then impacting on each other or on the wall of the hole 40, to create rattling, clicking noises.

It can also be envisaged to install other types of mobile bodies on that part of the connecting rod 30 passing through the holes 40. Mention can be made, but not limited thereto, of elongate bodies or pork rind, of quick attaching mechanism such as a swivel for example.

It will be understood that various modifications and/or improvements obvious to persons skilled in the art can be made to the different embodiments of the invention described in the present description without departing from the scope of the invention defined by the appended claims. In particular, reference is made to rigid lures but it can be envisaged for example to apply the invention to soft lures.

The invention claimed is:

1. A fishing lure comprising:
   a monolithic body having a front end and a rear end with at least one part of the body formed of a non-metallic material;
   a first loop provided at the front end;
   a second loop provided at the rear end;
   a longitudinal connecting rod passing through the body and connecting the first loop with the second loop; and
   at least one through-hole passing through the body in a transverse direction and arranged in the body between the front end and the rear end, wherein the connecting rod passes through the through-hole and wherein the through-hole has a cross-section substantially smaller than a length of the body.

2. The fishing lure according to claim 1, further comprising at least one mobile body arranged in the through-hole and attached to the connecting rod.

3. The fishing lure according to claim 1, wherein the through-hole has a circular cross-section.

4. The fishing lure according to claim 1, wherein the through-hole has a cross-section having a least one dimension equal to or greater than ten millimeters.

5. The fishing lure according to claim 1, wherein its length is equal to or longer than fifty millimeters.

6. The fishing lure according to claim 2, wherein the mobile body comprises a propeller rotatably disposed on the connecting rod.

7. The fishing lure according to claim 1, wherein the through-hole is arranged in a rear half of the body.

8. A fishing lure comprising:
   a monolithic non-metallic body, having a front end and a rear end;
   a first loop arranged at the front end;
   a second loop arranged at the rear end;
   a longitudinal connecting rod passing through the body and connecting the first loop with the second loop; and
   at least one through-hole passing through the body in a transverse direction and arranged in the body between the front end and the rear end, wherein the connecting rod passes through the through-hole and wherein the through-hole has a cross section substantially smaller that a length of the body.

9. The fishing lure according to claim 8, further comprising at least one mobile body arranged in the through-hole and attached to the connecting rod.

10. The fishing lure according to claim 9, wherein the through-hole has a circular cross-section.

11. The fishing lure according to claim 8, wherein the connecting rod is made of stainless steel.

12. The fishing lure of claim 1 wherein the body has a density so that the lure floats on a surface of a body of water.

13. The fishing lure of claim 1 wherein the front end has an obconic profile.

14. The fishing lure of claim 1 wherein the front end has a concave surface.

15. The fishing lure of claim 1 further comprising a second through-hole passing through the body in a transverse direction and arranged adjacent to the at least one through-hole.

16. The fishing lure of claim 1 further comprising a third loop provided on an underside of the lure.

* * * * *